Patented Aug. 22, 1944

2,356,576

UNITED STATES PATENT OFFICE 2,356,576

PROCESS FOR THE CATALYTIC CRACKING OF HYDROCARBON OILS

Gerhard Free and Wilhelm v. Fuener, Ludwigshafen-on-the-Rhine, and Otto Goehre, Heidelberg, Germany; vested in the Alien Property Custodian No Drawing. Application August 8, 1939, Serial No. 289,044. In France August 8, 1938

10 Claims. (Cl. 196—52)

The present invention relates to a process for the production of liquid hydrocarbons from carbonaceous substances, in particular for the catalytic cracking of hydrocarbon oils or the destructive hydrogenation of coals, tars and mineral oils.

We have found that the cited reactions can be carried out in a very favorable manner by using catalysts which have been produced by mixing solutions of inorganic gel-forming substances with metal salt solutions and, if desired, a precipitant and heating for the gel formation up to a temperature of at most about 100° C.

For the preparation of the catalyst the procedure may be that only the solution of the gel-forming substance, or only the metal salt solution or, when a precipitant is used, only the latter is heated before mixing, for example to 30° C., and preferably to a higher temperature, as for example 50° C. or up to the neighborhood of the boiling point of the solvent. Alternatively more than one of the constituents to be mixed, as for example the metal salt solution and the precipitant, may be heated before mixing, or the heating may be effected after the mixing. Furthermore the sequence in which the said solutions are mixed may be as desired.

As gel-forming substances there may be mentioned compounds of elements which are capable of forming gels from their aqueous solutions, as for example silicon, titanium, zirconium, thorium or cerium. For example aqueous solutions of waterglass may be used.

As metal salts to be added there may be mentioned salts of metals of the 2nd to the 8th groups of the periodic system, in particular of metals of the 5th or 6th groups or of the iron group, as for example iron, tin, zinc or magnesium. When a precipitant is to be used, there are added thereto for example solutions of ammonia, ammonium carbonate, ammonium sulphide, alkali or the like. The precipitant should as far as possible be capable of precipitating both the gel and the metal salt. For this reason it is sometimes necessary to use a plurality of precipitants, as for example first an agent promoting the formation of gel and then an agent serving to precipitate the metal salt. The metal salt in solution may also be gel forming; it is possible therefore for example to mix waterglass solutions with solutions of salts of aluminum or titanium.

In the preparation of the catalysts without using a precipitant it is sometimes advantageous to take care during the mixing of the gel-forming solution with the metal salt solution that precipitation does not take place at first. This is effected by taking care that the mixture contains acid in excess. For example an acid or neutral solution of the metal salt, as for example aluminum nitrate, sulphate or chloride, may be added to an alkaline or acid waterglass solution, the solutions being so adjusted to each other that an excess of acid is present after mixing. The acid reaction is preferably maintained by allowing the alkaline or neutral solution to flow into the acid solution. It is also possible to add acid, as for example dilute hydrochloric acid, during or shortly after the mixing of the solutions. The heating to produce precipitation takes place as above stated. During the heating of the mixture the solvent may be removed to a great extent at the same time.

The catalyst may also be obtained by first producing the gel from the solution of the gel-forming substance by the addition of a precipitant and then adding the metal salt. For example the hot solution of the gel-forming substance may be poured into the cold precipitant or the cold solution of the gel-forming substance may be added to the hot precipitant, or in both cases, conversely, the precipitant may be introduced into the solution of the gel-forming substance; both solutions may also be heated.

The gel thus obtained may be mixed either together with the liquid or, after its removal, in a moist state, with a solution of one or more salts of the abovementioned metals.

The solution of the gel-forming substance may also be mixed with the metal salt solution and the precipitant added simultaneously or subsequently, whereby at least one of the components must be heated or a subsequent heating of the mixture must be carried out for the production of the gel. The precipitant for the gel may also be present in the metal salt solution during the mixing.

The gel produced with or without precipitant and containing one or more metal compounds is then separated from the liquid, washed and dried and heated to a high temperature. For example the mixture may be evaporated to dryness and then preferably further heated to temperatures up to 250° C., in some cases even to higher temperatures, as for example to 300° to 800° C., whereby the metal salt or salts precipitated on the gel may be converted into other compounds.

The mixture containing the gel may also be concentrated at about 100° C., filtered before drying, the residue washed if necessary to remove the precipitant used in the preparation of the gel and then dried and if necessary heated to a higher temperature, as for example up to 800° C.

Alternatively, after removing the greater part of the solvent, the resulting gel-like product may be washed before the heating to high temperatures, either with water or first with an alkaline solution and then with water. The heating to high temperatures is preferably not carried out too rapidly, for example at least within one or more hours.

The proportion of gel in the catalyst is preferably from 30 to 75 per cent, but may be lower or higher. When the catalyst contains silicon and aluminum, either alone or with other components, the ratio of $SiO_2:Al_2O_3$ should preferably be less than about 75:25.

It is advantageous to use catalysts which have been prepared from a silic acid gel and the solution of a salt or a trivalent metal, as for example containing silicon and aluminum or silicon and iron; other compositions, as for example silicon and magnesium or aluminum (as gel-forming substance) and magnesium, may, however, also be used. It is of advantage to combine silicon or aluminum or the said compositions with one or more of the following metals: zinc, tin, titanium, chromium, molybdenum, tungsten, iron, nickel or cobalt.

It may also be advantageous wholly or for the most part to dissolve out again from the catalyst the metallic component introduced by the metal salt solution, for example by means of inorganic or organic acids. The resulting product is then washed well, dried and heated. The dissolving out of the said components may also be carried out in the moist state before a strong heating has taken place.

It is also advantageous to incorporate with the catalyst during its preparation, as for example before, during or after the heating, a small amount of boric acid, as for example 0.2 to 10 per cent. The preparation of the catalyst may also be carried out in the presence of bleaching earths or bauxite or similar substances. The catalyst may also be preformed with carbonaceous substances, as for example graphite, and then heated to high temperatures, as for example from 500° to 800° C.

The catalyst is eminently suitable for the cracking of mineral oils, tars, destructive hydrogenation products of solid carbonaceous substances, such as coals, tars, wood, and also of mineral oils and the like, as well as of extraction products of coals, cracking products of hydrocarbon oils or fractions of these substances. The cracking is carried out at atmospheric or increased pressure as for example from 10 to 200 atmospheres, preferably at increasing pressure and at temperatures of from 300° to 700° C., preferably at increasing temperatures.

The catalyst is also suitable for the destructive hydrogenation of coals, tars and mineral oils at temperatures of from 350° to 650° C. and at pressures above 100 atmospheres, preferably above 250 atmospheres, as for example at from 300 to 700 atmospheres, and especially in the treatment of hydrocarbon oils in the gas phase. It is of advantage, when using a catalyst which still contains aluminum and/or magnesium in addition to silicon, to operate at a pressure above 400 atmospheres. If on the other hand a metal compound having a marked hydrogenation effect be deposited on the catalyst, then pressures of less than 400 atmospheres may be employed.

In destructive hydrogenations it is especially advantageous to provide a catalyst, for example containing aluminum and/or magnesium, with one or more heavy metal compounds of metals of the 5th and 6th groups of the periodic system, in particular sulphides, as for example molybdenum sulphide, tungsten sulphide, nickel sulphide and/or iron sulphide.

The following examples will further illustrate how the said invention may be carried out in practice but the invention is not restricted to these examples.

*Example 1*

650 grams of waterglass solution (26 per cent of $SiO_2$) are diluted with water to 3 liters and acidified with 160 cubic centimeters of hydrochloric acid (concentrated). This solution is adjusted to a pH value of from 4.5 to 5.0 by the addition of ammonia, heated to 95° C., stirred and while stirring at this temperature a solution of 687 grams of aluminum nitrate

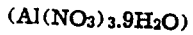

$(Al(NO_3)_3.9H_2O)$ and 30 grams of iron chloride ($FeCl_3.6H_2O$) in 2 liters of water is added. The acid thus set free is continuously neutralized with such an amount of ammonia that the pH value of from 4.5 to 5.0 is maintained during the precipitation. The precipitate is filtered, washed first with acidified water (pH 4.5 to 5.0) and then with pure water, dried, shaped and heated to a temperature of 450° C. If a paraffin-basic petroleum middle oil (boiling limits 210° to 360° C.) be led over 100 cubic centimeters of this catalyst at 460° C. with a throughput of 100 cubic centimeters per hour, the reaction product contains 40 per cent of constituents boiling up to 200° C. The loss amounts to about 3 to 4 per cent of the initial material.

*Example 2*

The catalyst described in Example 1 is impregnated with a 10 per cent solution of ammonium bisulphotungstate which contains an excess of ammonium sulphide, then dried in the absence of air and treated with hydrogen at a temperature of 400° C. The resulting catalyst contains 10 per cent of tungsten sulphide. If the vapors of a paraffin-basic gas oil with a boiling point range between 200° and 350° C., be passed over the said catalyst at a temperature of 400° C. under a hydrogen pressure of 2 atmospheres, 67 per cent of benzine are obtained having an octane number of 77.

What we claim is:

1. In a process for the production of liquid hydrocarbons by thermal treatment of carbonaceous substances at a temperature of from 300 to 700° C. in the presence of a catalyst obtained from an acid mixture of silica gel with a compound of a polyvalent metal, the improvement which comprises using a catalyst which has been produced by mixing a silicic acid sol with an aqueous solution of at least one water-soluble salt of a polyvalent metal, while maintaining throughout the process of mixing an acid reaction sufficient to prevent immediate precipitation and precipitating the gel by applying heat up to a temperature of 100° C. while maintaining the mixture on the acid side.

2. In a process for the production of liquid hydrocarbons by thermal treatment of carbonaceous substances at a temperature of from 300 to 700° C. in the presence of a catalyst obtained from an acid mixture of silica gel with a compound of a polyvalent metal, the improvement which comprises using a catalyst which has been produced by mixing a silicic acid sol with an aqueous solution of at least one water-soluble salt of aluminum, maintaining throughout the process of mixing an acid reaction sufficient to prevent immediate precipitation and precipitating the gel by applying heat up to a temperature of 100° C. while maintaining the mixture on the acid side.

3. In a process for the production of liquid hydrocarbons by thermal treatment of carbonaceous substances at a temperature of from 300 to 700° C. in the presence of a catalyst obtained from an acid mixture of silica gel with a compound of a polyvalent metal, the improvement which comprises using a catalyst which has been produced by mixing a silicic acid sol with an aqueous solution of at least one water-soluble salt of magnesium, maintaining throughout the process of mixing an acid reaction sufficient to prevent immediate precipitation and precipitating the gel by applying heat up to a temperature of 100° C. while maintaining the mixture on the acid side.

4. In a process for the catalytic destructive hydrogenation of carbonaceous materials at a temperature of from 350 to 650° C. and at pressures above 100 atmospheres in the presence of a catalyst obtained from an acid mixture of silica gel with a compound of a polyvalent metal, the improvement which comprises using a catalyst which has been produced by mixing a silicic acid sol with an aqueous solution of at least one water-soluble salt of aluminum, maintaining throughout the process of mixing an acid reaction sufficient to prevent immediate precipitation and precipitating the gel by applying heat up to a temperature of 100° C. while maintaining the mixture on the acid side.

5. In a process for the catalytic destructive hydrogenation of carbonaceous materials at a temperature of from 350 to 650° C. and at pressures above 100 atmospheres in the presence of a catalyst obtained from an acid mixture of silica gel with a compound of a polyvalent metal, the improvement which comprises using a catalyst which has been produced by mixing a silicic acid sol with an aqueous solution of at least one water-soluble salt of magnesium, maintaining throughout the process of mixing an acid reaction sufficient to prevent immediate precipitation and precipitating the gel by applying heat up to a temperature of 100° C. while maintaining the mixture on the acid side.

6. A process as claimed in claim 4 which consists in using a catalyst of the type described in claim 4 which in addition comprises at least one metal compound of a metal of the 6th group of the periodic system.

7. A process as claimed in claim 5 which consists in using a catalyst of the type described in claim 5 which in addition comprises at least one metal compound of a metal of the 6th group of the periodic system.

8. In a process for the production of liquid hydrocarbons by catalytic cracking of hydrocarbon oils at a temperature of 300–700° C. in the presence of a catalyst obtained from an acid mixture of silica gel with a compound of a polyvalent metal, the improvement which comprises using a catalyst which has been produced by mixing a silicic acid sol with an aqueous solution of at least one water-soluble salt of a polyvalent metal, while maintaining throughout the process of mixing an acid reaction sufficient to prevent immediate precipitation and precipitating the gel by applying heat up to a temperature of 100° C. while maintaining the mixture on the acid side.

9. A process according to claim 8 in which said polyvalent metal is aluminum.

10. A process according to claim 8 in which said polyvalent metal is magnesium.

GERHARD FREE.
WILHELM v. FUENER.
OTTO GOEHRE.